US006829971B1

(12) United States Patent
Huang et al.

(10) Patent No.: US 6,829,971 B1
(45) Date of Patent: Dec. 14, 2004

(54) CUTTING FIXTURE FOR HEAT-SHRINK FILM SLEEVE LABELING MACHINES

(76) Inventors: Chien-Tsai Huang, No. 96, Jin Der Rd., Yang-Mei, Taoyuan (TW); Chun-Hsiang Huang, 2F, No. 146, Sec. 1, Jongshan E. Rd., Chungli, Taoyuan (TW)

( * ) Notice: Subject to any disclaimer, the term of this patent is extended or adjusted under 35 U.S.C. 154(b) by 0 days.

(21) Appl. No.: 10/453,496

(22) Filed: Jun. 4, 2003

(51) Int. Cl.[7] .................................................. B26D 5/08
(52) U.S. Cl. ........................ 83/597; 83/647.5; 83/946
(58) Field of Search ......................... 83/602, 946, 597, 83/647, 647.5; 53/551, 552, 557, 563, 576, 389.3; 493/288, 363, 372; 156/86

(56) References Cited

U.S. PATENT DOCUMENTS

| | | | | |
|---|---|---|---|---|
| 3,478,627 A | * | 11/1969 | Marion ......................... 82/70.2 |
| 3,814,893 A | * | 6/1974 | Helms et al. ............. 219/69.15 |
| 3,954,071 A | * | 5/1976 | Mall et al. ................... 112/311 |
| 5,207,136 A | * | 5/1993 | Evard et al. .................... 82/130 |
| 5,297,462 A | * | 3/1994 | Creaden ........................ 83/305 |
| 5,531,858 A | * | 7/1996 | Hong .......................... 156/556 |
| 5,791,220 A | * | 8/1998 | Liao ............................. 83/364 |
| 5,916,343 A | * | 6/1999 | Huang et al. ................... 82/59 |
| 5,970,685 A | * | 10/1999 | Huang ....................... 53/389.3 |
| 6,502,488 B1 | * | 1/2003 | Taylor .......................... 82/130 |

* cited by examiner

Primary Examiner—Stephen Choi (57) ABSTRACT

An improved cutting fixture for heat-shrink film sleeve labeling machines comprised of a mounting frame disposed around the outer periphery of the center guide post in a sleeve labeling machine that secures a plurality of blade assemblies at equal intervals apart. Each blade assembly is positioned on a drive plate by means of an inserted eccentric shaft to maintain synchronous operation. The eccentric shafts of the blade assembly are driven into reciprocal rotation by a power structure, each eccentric shaft causing the blades at their lower extents to alternately project and retract for cutting heat-shrink film at a required travel and time to effectively shorten the period involved and thereby increase production efficiency. Each cutter shaft is restrained by a check plate and anchoring screws to prevent 360-degree free rotation, which not only results in safer blade replacement, but at the same time also prolongs the service life of the transmission and structural components.

4 Claims, 15 Drawing Sheets

CUTTING FIXTURE FOR HEAT-SHRINK FILM SLEEVE LABELING MACHINES

BACKGROUND OF THE INVENTION

1) Field of the Invention

The invention herein relates to manufacturing equipment, specifically an improved cutting fixture for heat-shrink film sleeve labeling machines.

2) Description of the Prior Art

The operating approach of conventional sleeve labeling machines involves pulling heat-shrink film past a center guide post such that after the heat-shrink film is drawn into a tubular state, it is cut to the required length, slipped over a container such as a bottle, and then heated to fix the already cut heat-shrink film onto the container.

Figure 1:
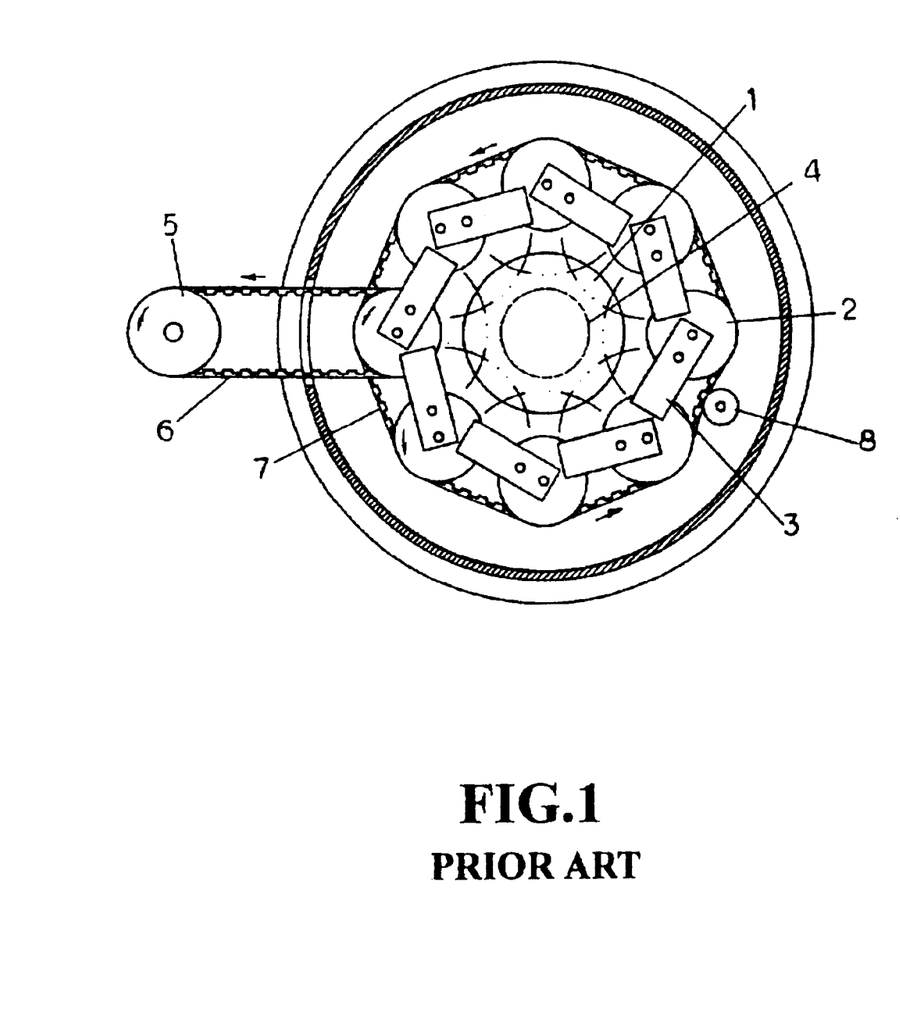
FIG. 1 is an orthographic drawing of a conventional cutting fixture (1).

The arrangement of the cutting fixture in such conventional heat-shrink film sleeve labeling machines, as shown in FIG. 1, typically consists of revolving blade mounts 2 each carrying a blade 3 and disposed at equal intervals apart in a circular star pattern surrounding the center guide post 1, a circular groove 4 around the center guide post 1 facing towards the blades 3, a gear (not shown in the drawings) situated on the revolving blade mount 2, and a motor 5 driving two cogged belts 6 and 7 that are coupled to the revolving blade mount 2 via a transmissive wheel which enables the simultaneous rotation of all the revolving blade mounts 2, while causing the blades 3 to rotate within the circular groove 4 of the revolving blade mount 2 and thereby cut the heat-shrink film sleeving. Since the cogged belt 7 drives all of the said revolving blade mounts 2 to rotate simultaneously such that a synchronized 360-degree rotation occurs prior to each instance of cutting by the blades 3. Although such an operating approach achieves the objective of cutting the heat-shrink film sleeving, the following shortcomings happen:

1. Since the said revolving blade mount 2 and blade 3 must rotationally travel 360 degrees to perform a cut, a minimum of 180 degrees or more of travel and time are wasted because no work is done, a shortcoming which obviously hampers cutting rate and makes it impossible to increase production efficiency.

2. Since the cogged belt 7 of the said revolving blade mount 2 is a looped construct, long-term usage gives rise to elastic fatigue and results in elongation from stretching such that after a period of cutting operation, the revolving blade mount 2 and blades 3 are no longer capable of synchronized rotational cutting and fully cutting the heat-shrink film sleeving, leaving partially cut areas or slashes that impart unevenness. Although Idler wheel 8 constantly exerts pressure against the cogged belt 7 and remedies the said drawback, this is still a troublesome and inconvenient operating fault.

3. Since the blades 3 must be replaced regularly to maintain edge sharpness and smoothness, and the said revolving blade mounts 2 have to be kept capable of 360-degree free rotation, during blade 3 replacement, the operator must grasp or exert force against the cogged belts 6 and 7 with one hand and then remove and install the blade screws 9 with the other hand, a procedure that is obviously troublesome, inconvenient, and hazardous, while also adversely affecting the usable service life of the cogged belts 6 and 7.

Figure 2:
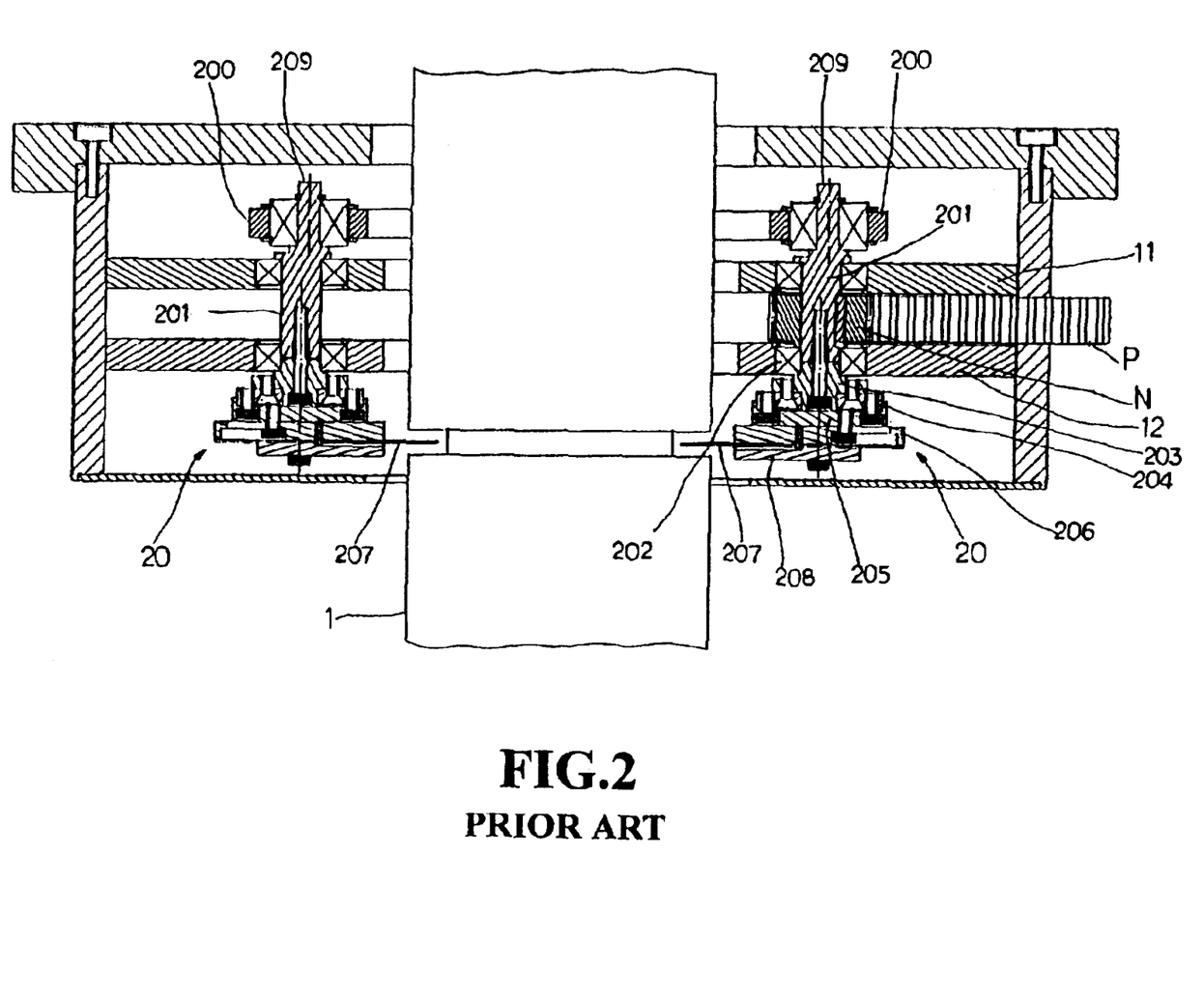
FIG. 2 is a cross-sectional drawing of a conventional cutting fixture (2).
Figure 3:
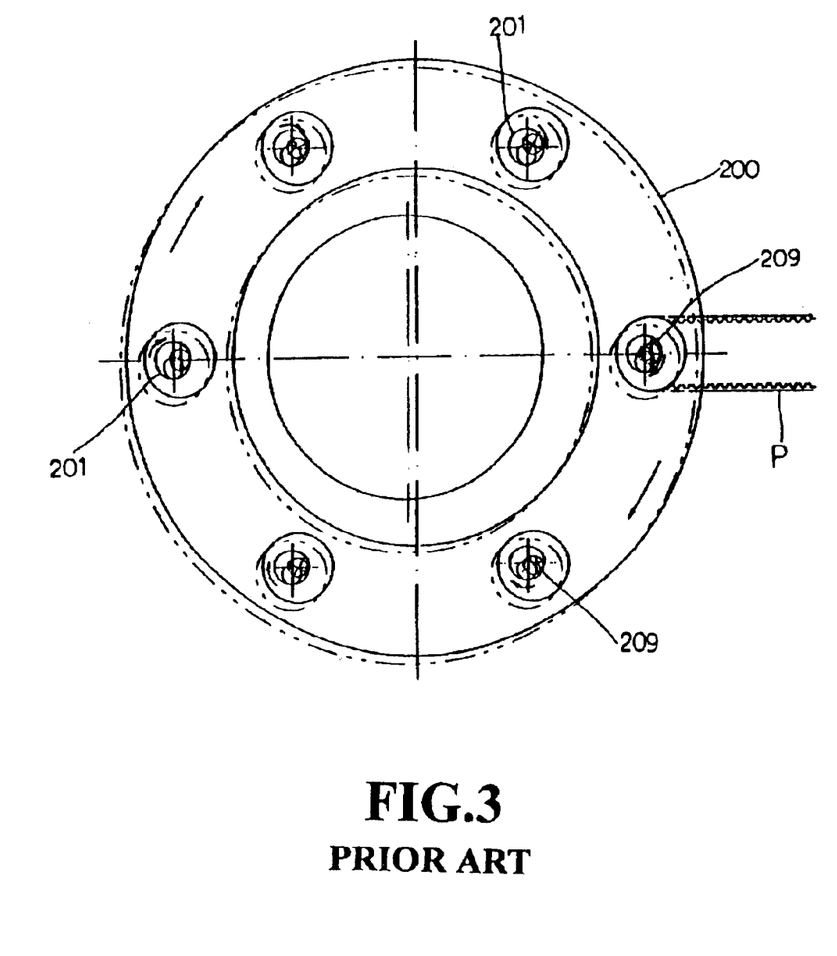
FIG. 3 is an orthographic drawing of FIG. 2 in the driven state.
Figure 4:
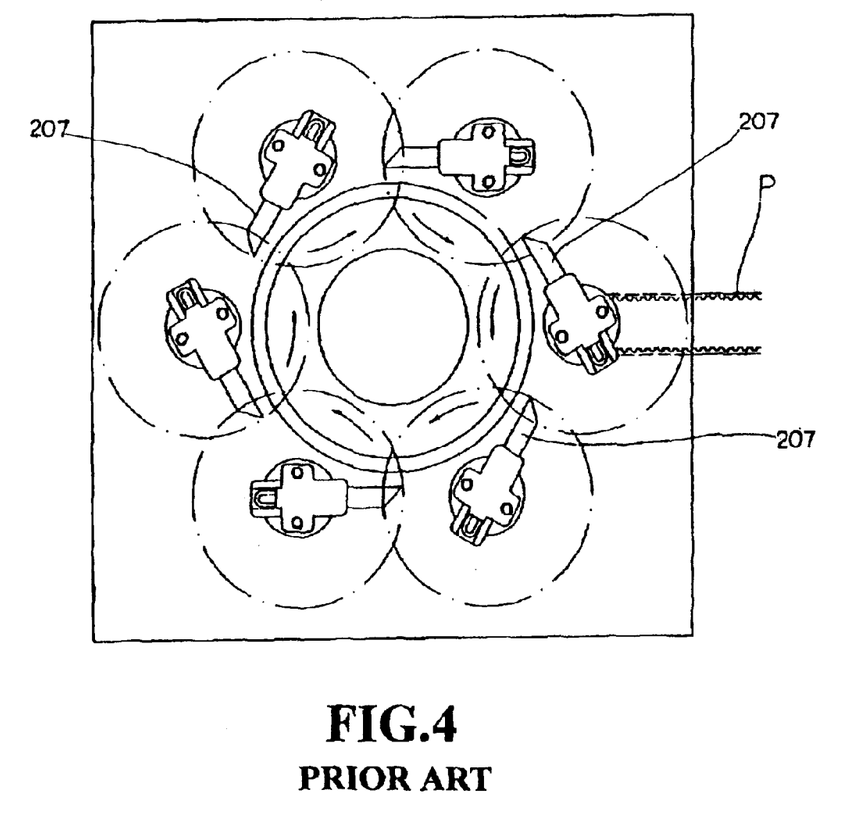
FIG. 4 is an orthographic drawing of FIG. 2 in the driven state.

To improve upon the said shortcomings, manufacturers have introduced another type of cutting fixture, as indicated in FIG. 2, FIG. 3, and FIG. 4, consisting of a plurality of blade assemblies 20 pivotably disposed on an upper and a lower mounting frame 11 and 12 surrounding the outer periphery of the center guide post 1; a shaft 201 in each blade assembly 20, the bottom extremity of which is fitted though an identical bearing 202 and into a connecting socket 203; a dial plate 204, a mounting base 205, a blade adjustment base 206, a blade 207, and a clamp plate 208 respectively positioned under the bottom portion of the connecting socket 203; and an eccentric shaft 209 at the top extremity of each shaft 201 that is pivotably disposed facing the hole area of a drive plate 200; additionally, a belt wheel N is installed on the shaft 201 of one blade assembly 20 that enables 360-degree driven rotation via a cogged belt P connected to an external power structure (such as a motor), the resultant coordinated operation of the eccentric shaft 209 and the drive plate 200 causing all the blades 207 to synchronously rotate 360 degrees while projecting and retracting (as shown in FIG. 4). Such an operating approach is undeniably workable as there is a solution for the drawback of the prior art revolving blade mount 2 and blade 3 due to the elastic fatigue of the cogged belt 7 that results in a loss of synchronized cutting performance; however, what has not been improved is the shortcoming wherein the said minimum of 180 degrees of travel and time are wasted and no work is done because the said blades 207 must rotate 360 degrees to complete a single instance of projection and retraction for the cutting operation; at the same time, since the said blades 207 all freely rotate 360 degrees, replacing the blades 207 as previously stated is a troublesome, inconvenient, and unsafe procedure and, furthermore, the service life of the cogged belt P is shortened; additionally, since the bearing 202 is situated at the top end of the said connecting socket 203 and the dial plate 204, the mounting base 205, the blade adjustment base 206, the blade 207, and the clamp plate 208 are at its lower end, the overall weight is so excessive that when driven at a high rate of rotation, stability is compromised, resulting in slashes that impart an uneven quality and poor appearance in the heat-shrink film.

Figure 5:
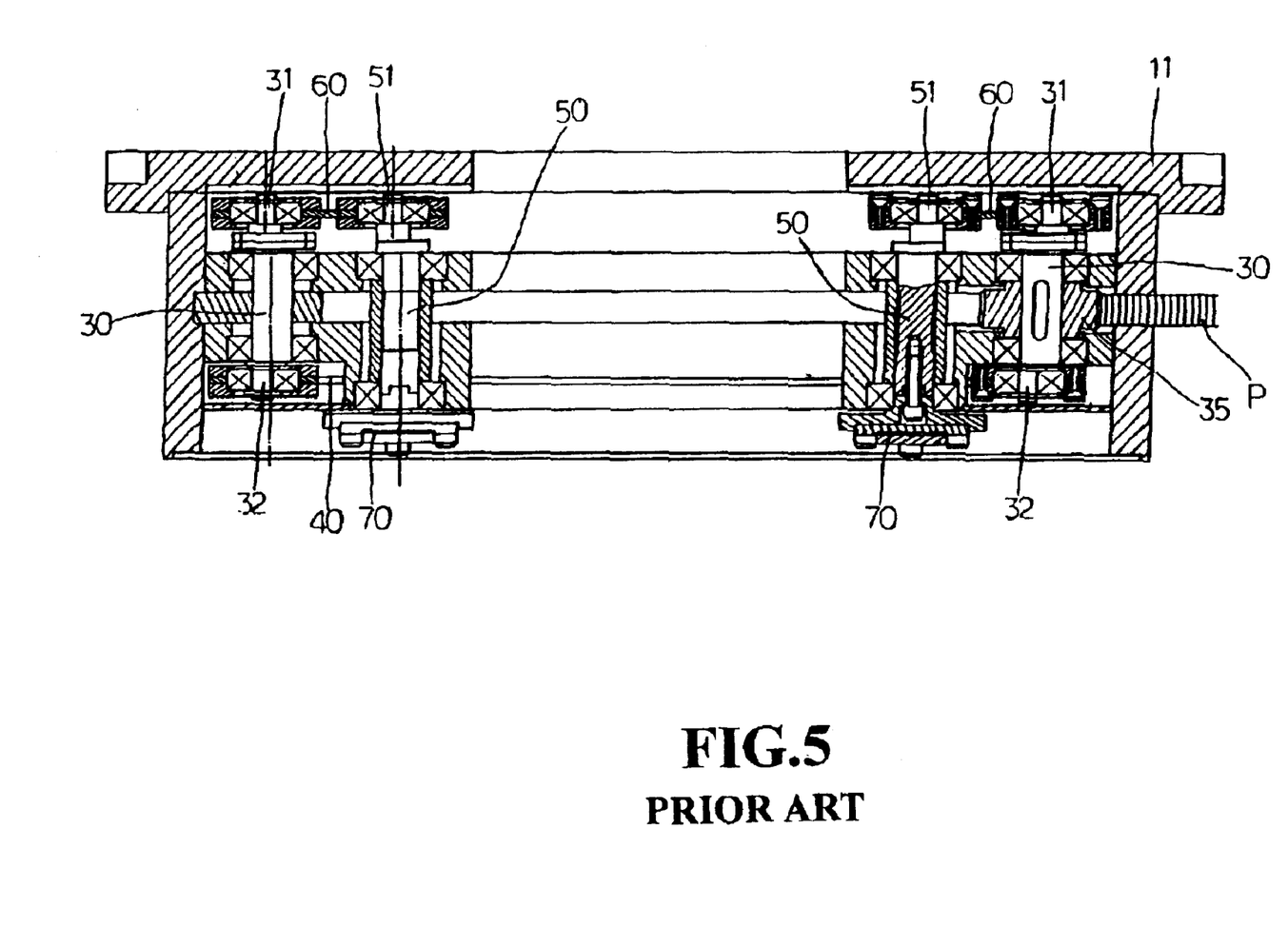
FIG. 5 is a cross-sectional drawing of a conventional cutting fixture (3).
Figure 6:
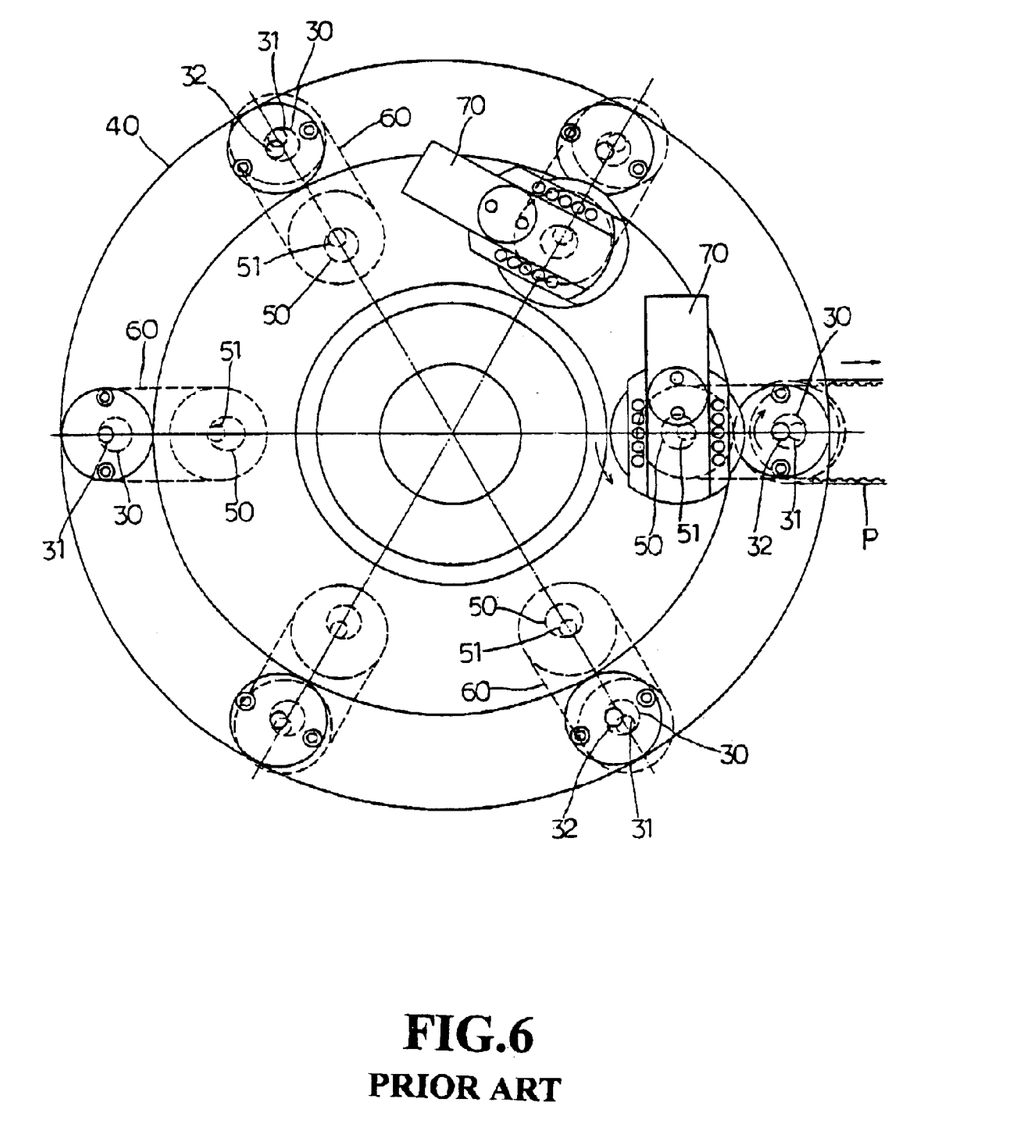
FIG. 6 is an orthographic drawing of FIG. 5 in the driven state.

To further enhance the practicality and performance of the cutting fixture of the said heat-shrink film sleeve labeling machine, manufacturers introduced the cutting fixture shown in FIG. 5 and FIG. 6, which consists of a plurality of blade assemblies disposed in circular pattern at equal intervals apart on a mounting frame 11; a separate, vertical first and second shaft 30 and 50 along which the said blade assemblies traverse; and an eccentric rod 32 of a different angle at the bottom extremity of the first shaft 30 in the hole of a drive plate 40, wherein the blade assembly first shaft 30 has a drive wheel 35 that enables 360-degree driven rotation via a cogged belt P connected to an external power structure (such as a motor), causing all the first shafts 30 to synchronously rotate in the same direction.

The said first and second shaft 30 and 50 have an upper eccentric rod 31 and 51 at their respective distal extremities and, furthermore, each group of two upper eccentric rods 31 and 51 is linked by a connecting rod 60 such that the first shaft 30, via the upper eccentric rod 31 and 51 as well as the connecting rod 60, cause each second shaft 50 and blade 70 at the bottom end to swing to the left and right, alternately projecting and retracting for the cutting operation.

Such an operating approach is arguably better than the preceding prior art; since the blade cutting action consists of a left and right reciprocation, not the said 360-degree rotation, that results in less idle time and travel, the arrangement provides for higher efficiency; however, the aspect of inadequacy is that achieving the projecting and retracting cutting action of the blade assemblies on the said drive plate 40 requires the installation of the connecting rod 60 between the first shaft 30 and the second shaft 50 of each blade assembly as well as other components (such as bearings and bearing seats, etc); as such, the structure is obviously of greater complexity and, furthermore, fabrication and assembly as well as maintenance and repair are more difficult, inconvenient, and uneconomical; additionally, since the projecting and retracting cutting action of the blades is based on the coordinated articulation of the connecting rod 60 along with the upper eccentric rod 31 and 51 of the first and second shaft 30 and 50, an unobstructed free swinging capability is maintained at all times; as such, during blade replacement, the operator must grasp the cogged belt P with one hand to keep the first shaft 30 and the drive plate 40 stationary and use the other hand for removing and installing the blade, a procedure which still has the drawbacks of being troublesome, inconvenient, and hazardous.

As conveyed above, the heat-shrink film cutting fixtures of conventional sleeve labeling machines still have shortcomings that require improvement.

SUMMARY OF THE INVENTION

The primary objective of the invention herein is to provide an improved cutting fixture for heat-shrink film sleeve labeling machines in which a plurality of blade assemblies are disposed at equal intervallic degrees apart in a circular pattern around the outer periphery of the center guide post, with each having their eccentric shafts situated at drive plates to maintain synchronized operation, and a power structure directly driving the eccentric shafts of the blade assemblies into reciprocal rotation at a settable angle, thereby maintaining the synchronization of the blade assembly blades and enabling a reciprocally rotational cutting action in a simple arrangement that increases production efficiency.

Another objective of the invention herein is to provide an improved cutting fixture for heat-shrink film sleeve labeling machines in which the shaft of each blade assembly blade is limited by a check plate and anchoring screws during reciprocal rotation so that 360-degree free rotation cannot occur so that the removal and installation of the said blade is not only simple, convenient, and rapid, but safer and of higher efficiency.

Yet another objective of the invention herein is to provide an improved cutting fixture for heat-shrink film sleeve labeling machines in which the power structure provides for setting the angle of reciprocal rotation, including the cogged belt, the transmission components, and so on are which are in a state of partial contact such that when wear occurs at points of contact, adjustment and changes can be effected at those positions, which not only enables precise and positive power transmission, but at the same time provides for prolonged service life and economic value.

DETAILED DESCRIPTION OF THE INVENTION

Figure 7:
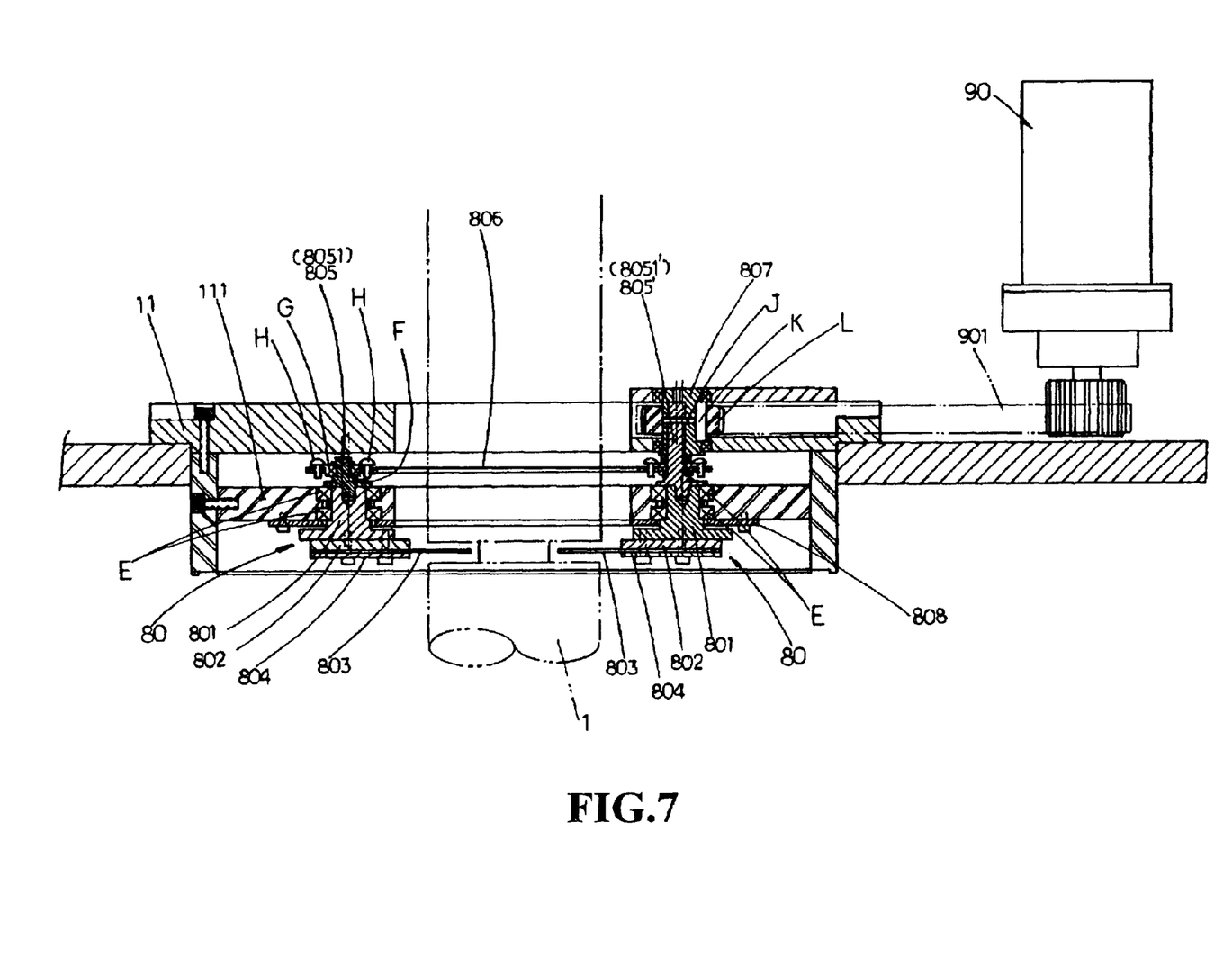
FIG. 7 is a cross-sectional drawing of the cutting fixture of the invention herein.
Figure 8:
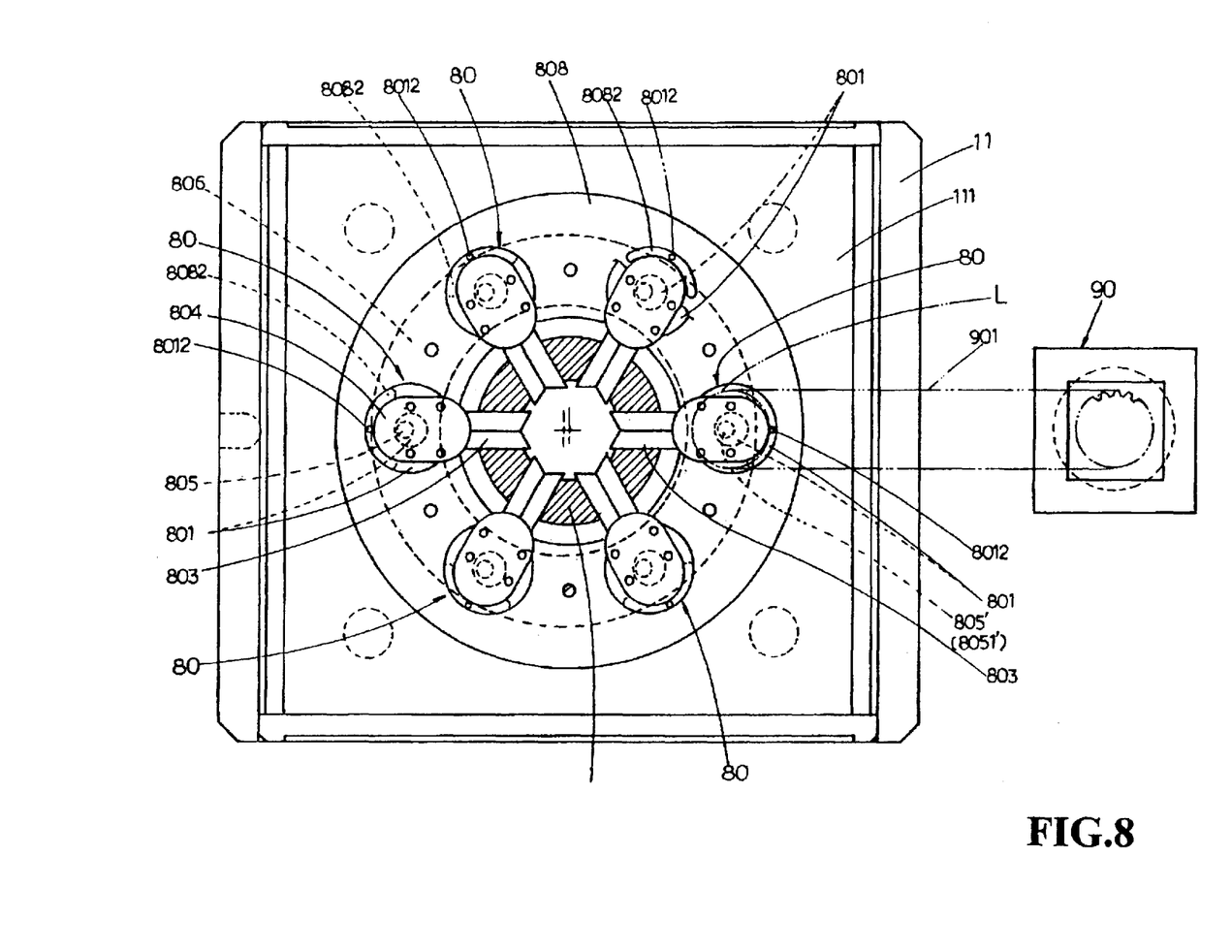
FIG. 8 is an orthographic drawing of FIG. 7, as viewed from the bottom.
Figure 9:
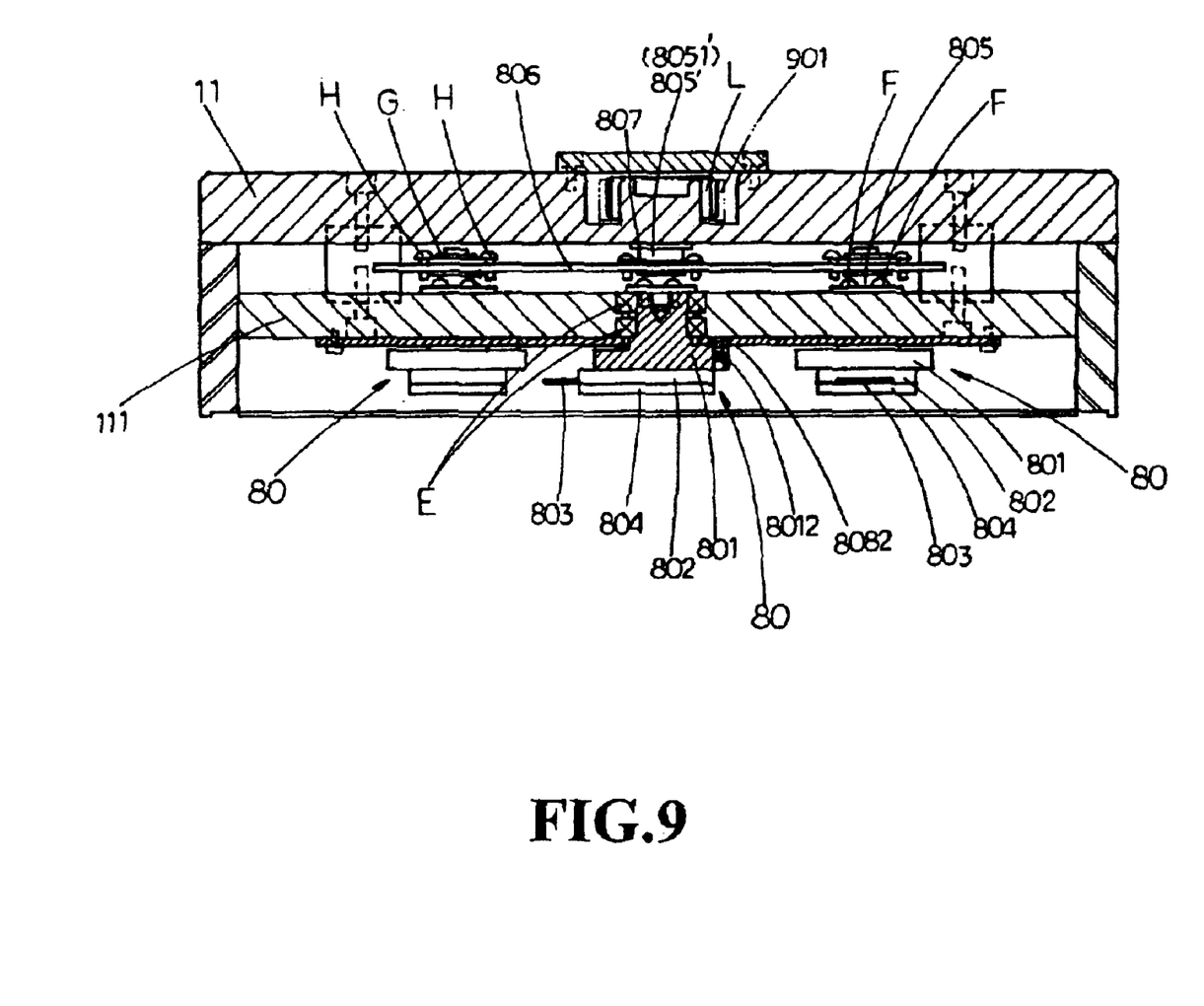
FIG. 9 is a cross-sectional drawing of FIG. 7, as viewed from the side.

Referring to FIG. 7, FIG. 8, and FIG. 9, the improved cutting fixture for heat-shrink film sleeve labeling machines of the invention herein comprises a mounting frame 11 disposed around the outer periphery of the center guide post 1 in a sleeve labeling machine that secures a plurality of blade assemblies 80 at equal intervals apart, with one of the blade assemblies 80 directly connected to a power structure 90 providing for its reciprocal rotation at a settable angle.

Figure 10:
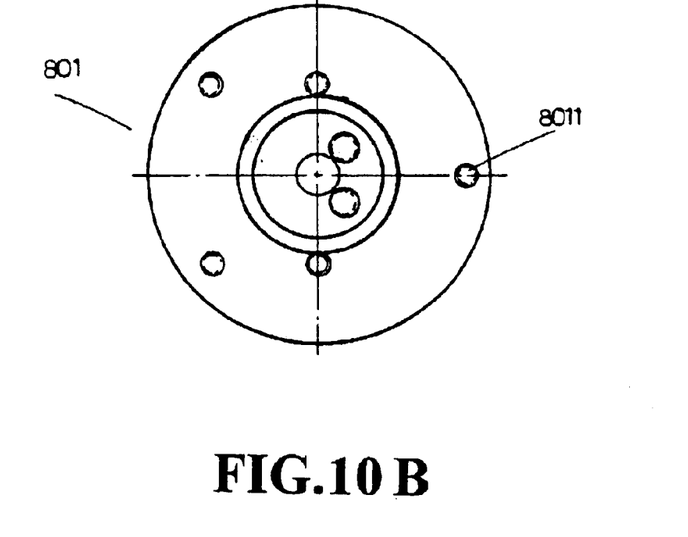
FIG. 10A is an orthographic, drawing of the cutter shaft of the invention herein, as viewed from the front.
FIG. 10B is a cross-sectional drawing of FIG. 10A, as viewed from the top.
Figure 10A:
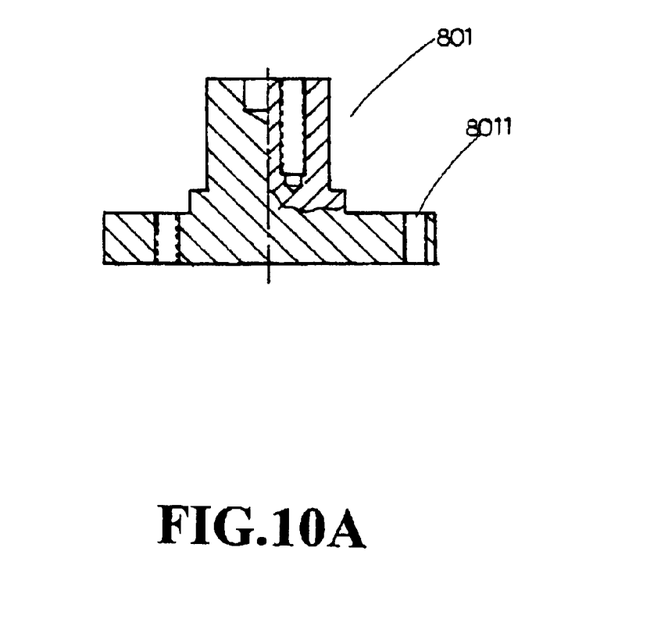
Figure 11A:
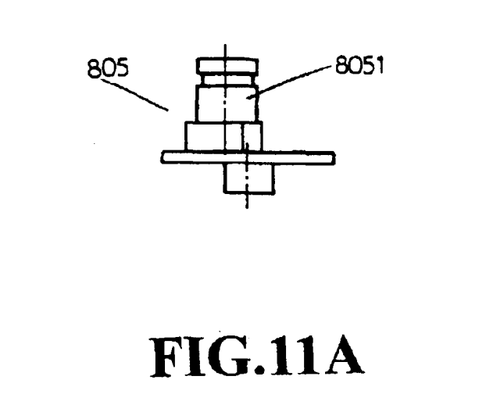
FIG. 11A is an orthographic drawing of the eccentric shaft of the invention herein, as viewed from the side.
Figure 11B:
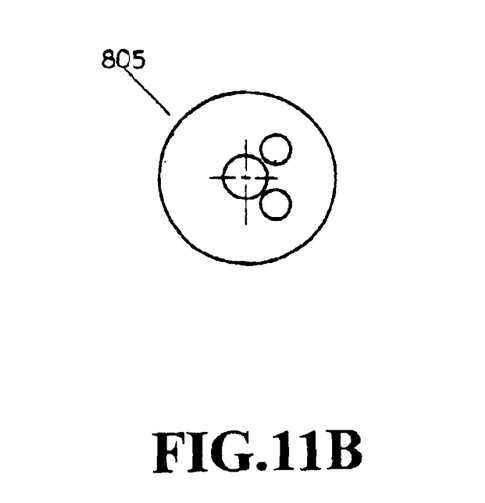
FIG. 11B is an orthographic drawing of FIG. 11A, as viewed from the bottom.
Figure 12:
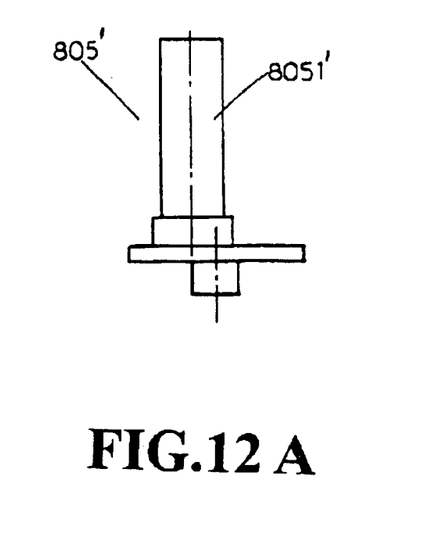
FIG. 12A is an orthographic drawing of the eccentric shaft driven by the power structure, as viewed from the front.
FIG. 12B is an orthographic drawing of FIG. 12A, as viewed from the bottom.
Figure 13:
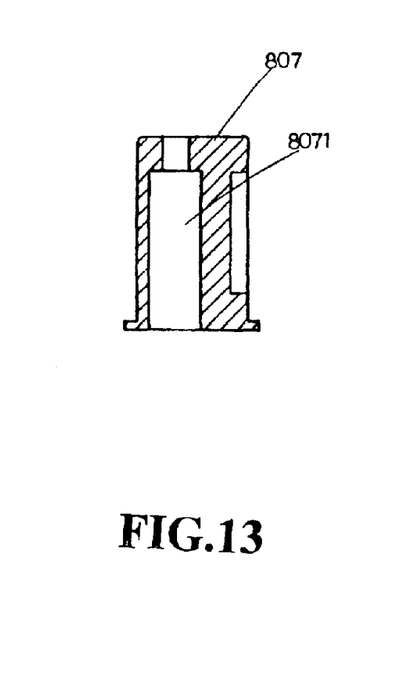
FIG. 13 is a cross-sectional drawing of the locating sleeve of the invention herein.
Figure 14:
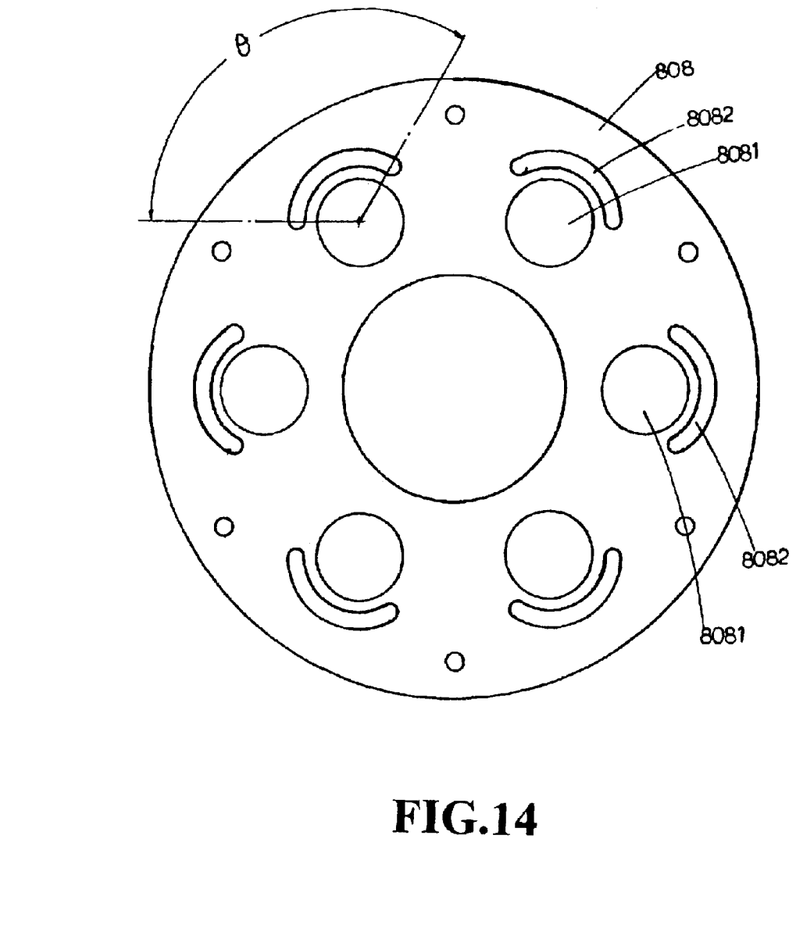
FIG. 14 is an orthographic drawing of check plate of the invention herein.

Each said blade assembly 80 includes a cutter shaft 801 (see FIG. 10A) in an upper and a lower bearing E that are seated within a corresponding hole through a support plate 111 of the mounting frame 11 to maintain it in a state of free rotation; a blade holder 802, a blade 803, and a blade cover 804 at the bottom section similar to the conventional arrangement; and an eccentric shaft 805 at the top section. After the eccentric shaft 805 (see FIG. 11) is positioned by screws F, the shaft tip 8051 at the upper extremity is placed into the eccentric position of a cutter shaft 801 and, furthermore, each said shaft tip 8051 is fitted into a bearing G, with screws H inserted and fastened in the corresponding holes of a drive plate 806 to thereby maintain synchronized operation. The shaft tip 8051' (see FIG. 12) at the upper extremity of a second eccentric shaft 805' is inserted into a locating sleeve 807 (see FIG. 13); in addition to an offset axial hole 8071 that provides for the shaft tip 8051' of the second eccentric shaft 805', and inserts and locates a Pin J. The locating sleeve 807 has a cutter shaft 801 arranged in line with it, with a key K fixing a timing gear L (a cogged belt gear) enabling the direct rotation of a cogged belt 901 by the power structure 90 that results in the synchronized rotation of the eccentric shaft 805, the cutter shaft 801, and the blade 803 by the drive plate 806. Furthermore, a check plate 808 (see FIG. 14) is positioned between the bottom section of the mounting frame 11 support plate 111 and each cutter shaft 801. It is formed with corresponding holes 8081 that provide for the posturing of each cutter shaft 80. Each of the corresponding holes 8081 has a radially disposed limit groove 8082 along its circumference. When the blade 803 on the cutter shaft 801 is aligned with the center glide post 1 (see FIG. 8) and the radial area is aligned with the limit groove 8082 closely arrayed threaded holes 8011 (see FIG. 10), anchoring screws 8012 are fastened therein such that they extend inward from the limit groove 8082 (see FIG. 8 and FIG. 9).

The said power structure 90 consists of a cogged belt 901 driven into reciprocal rotation by a servo-motor coupled to the blade assembly 80 timing gear L to achieve automatic clockwise and counter-clockwise operation at a set angle, or a clockwise/counter-clockwise motor circuit and sensor control, or other mechanical power structure (such as a gear box), the only requirement being the capability to reciprocally rotate the blade assembly 80 timing gear L at a set angle; however, for the embodiment of the invention herein, a presettable servo-motor that allows the adjustment of the clockwise/counter-clockwise angle of rotation is the most expedient.

When the timing gear L of the blade assembly 80 is driven by the power structure 90, since the drive plate 806 synchronously rotates the remaining blade assembly 80 eccentric shafts 805, cutter shafts 801, and blades 803, when the power structure 90 induces reciprocal rotation at a set angle, the blades 803 of each blade assembly 80 alternately project and retract in a synchronized shearing action. However, the angle of reciprocal rotation by the driven said timing gear L is dependent on the quantity of blade assemblies 80 circularly disposed around the outer periphery of the center guide post 1, wherein it is only necessary to ensure that the rotational range of the adjacent blade assembly 80 blades 803 have sufficient clearance to enable the full cutting of heat-shrink film around the center guide post 1; in the case of a large quantity of blade assemblies 80, then the driven angle of reciprocation by the timing gear L is set lower and, conversely, if there is a lesser quantity of blade assemblies 80, then the driven angle of reciprocation by the timing gear L must be higher, the particular results enabling the blade assembly 80 blades 803 to synchronously rotate 120 degrees and thereby perform cutting operations.

The included angle 0 (see FIG. 14) defined by the two ends of the check plate 808 limit groove 8082 is similarly dependent on the quantity of blade assemblies 80 installed; however, the included angle θ is set slightly larger than the angle of reciprocal rotation at which tho timing gear L is driven so that the anchoring screws 8012 fastened thereon cannot impact the two extremes of the limit groove 8082 when the cutter shafts 801 of each said blade assembly 80 are reciprocally rotated.

Figure 15:
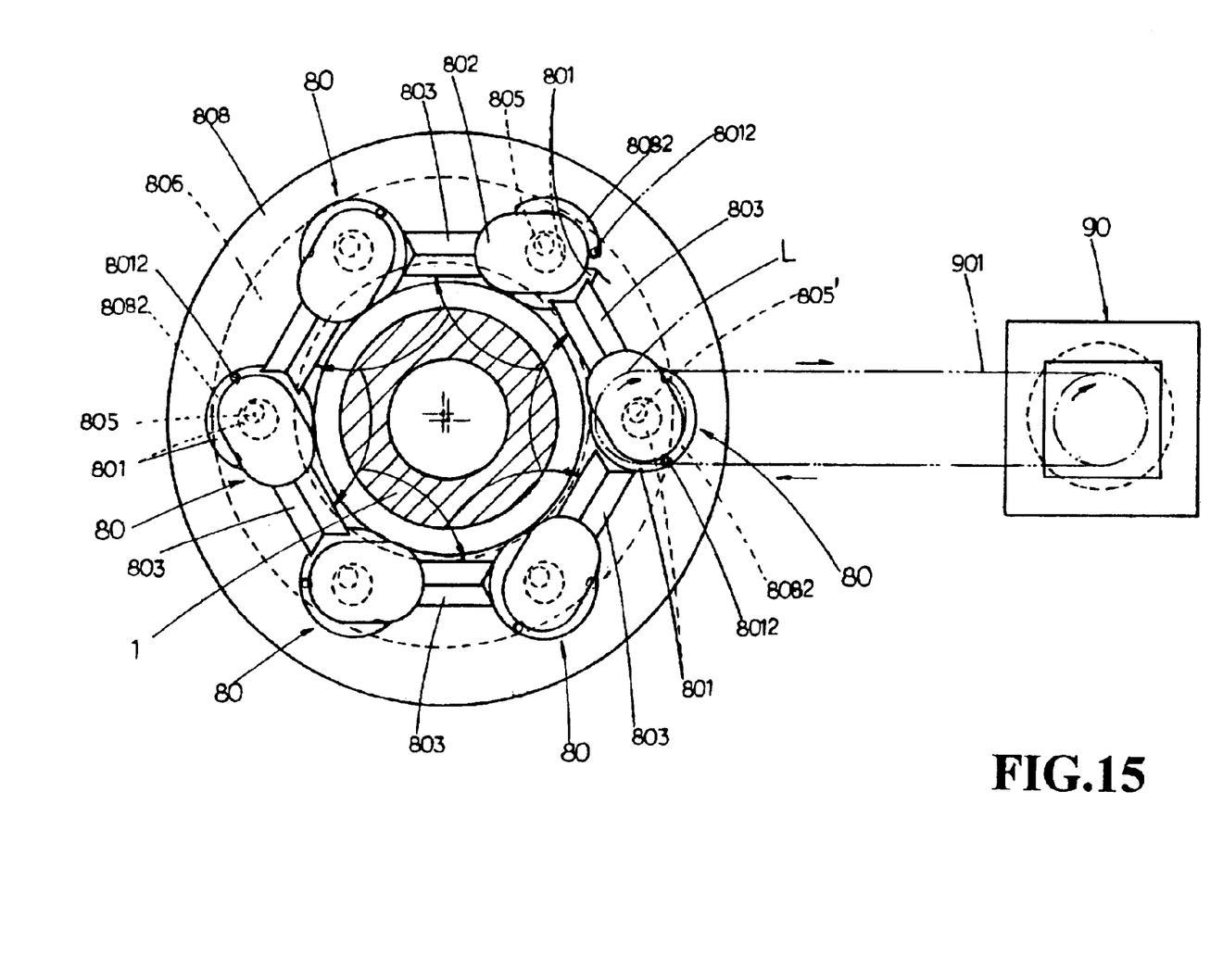
FIG. 15 is an orthographic drawing of the invention herein during the clockwise rotational cutting state, as viewed from the bottom.
Figure 16:
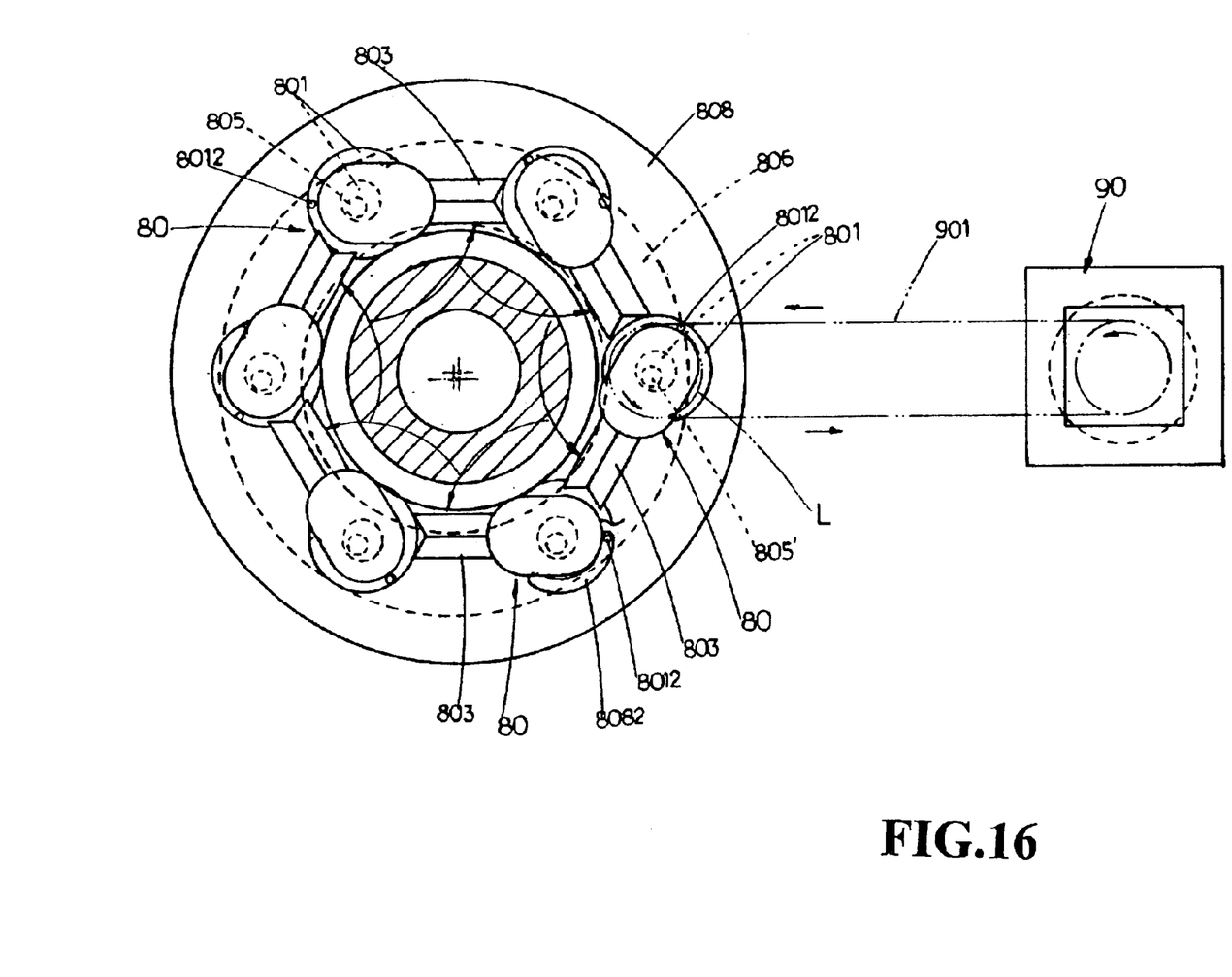
FIG. 16 is an orthographic drawing of the invention herein during the counter-clockwise rotational cutting state, as viewed from the bottom.

In the said arrangement of the invention herein, referring to FIG. 15, when the power structure 90 is preset at an angle for clockwise rotation, the cogged belt 901 drives the timing gear L of a blade assembly 80 into clockwise rotation at the set angle such that the drive plate 806, the eccentric shafts 805 (805'), and the cutter shafts 801 are coordinatively brought into motion and all the said blade assembly 80 blades 803 synchronously rotate in a clockwise direction to execute a single cutting operation of heat-shrink film sleeving at the guide post 1; when the power structure 90 is preset at an angle for counter-clockwise rotation, as shown in FIG. 16, then all the blades 803 of the said blade assembly 80 accordingly rotate in a counter-clockwise direction to cut another section of heat-shrink film. In other words, the blades 803 of the invention herein only require setting the angle of reciprocal rotation to smoothly and, furthermore, rapidly and accurately cut heat-shrink film, without requiring the 360 degrees of rotation involved in the prior art, thereby affording a significant, tangible increase in production efficiency. Moreover, the straightforward structure of the invention herein is not only capable of articulating all the blades 803 at a set angle for reciprocally rotational cutting operations, but also provides for easy, convenient, and economical manufacture, assembly, repair, and maintenance.

Since the anchoring screws 8012 in each cutter shaft 801 are fastened such that they extend inward from the limit groove 8082 of the check plate 808, loading and unloading the blades 803 only requires removing the anchoring screw 8012 at one end of the limit groove 8082 on the blade holder 802 and the cutter shaft 801, the cutter shaft 801 remaining stationary to facilitate easy, convenient, and safe blade 803 replacement. When the power structure 90 malfunctions and the set angle of reciprocal rotation becomes higher or 360 degree rotation occurs, the anchoring screws 8012 can at that time serve as preventers at the check plate 808 limit groove 8082 that trigger a circuit-controlled relay such that the random rotation and cutting by the blades 803 cannot occur, which prevents mechanical damage and wear, while also greatly increasing operating safety.

Since the power structure 90 of the invention herein provides for setting the angle of reciprocal rotation and re-orienting transmission components such as the cogged belt 901, the timing gear L, and so on are which are in a state of partial contact such that when wear occurs at points of contact, adjustment and changes can be effected at those positions to enable continued utilization without requiring parts replacement; as such, the service life of structural components is prolonged for better economic efficiency.

What is claimed is:

1. A cutting fixture for a heat-shrink film sleeve labeling machine comprising:

a mounting frame disposed about a center guide post;

a plurality of blade assemblies coupled to said mounting frame spaced one from the other around the center guide post, each said blade assembly including a cutter shaft and an eccentric shaft extending therefrom, each said blade assembly having a blade extending radially from said cutter shaft and an anchoring screw disposed adjacent thereto, at least a first of said blade assemblies being driven by direct connection to a power structure;

said power structure including a timing gear engaging said first blade assembly for imparting a driving force thereto, whereby said first blade assembly is reciprocally rotated within a settable angle limit;

a drive plate extending between said eccentric shafts of said blade assemblies for transferring the driving force between said blade assemblies, said blade assemblies being operably coupled thereby for reciprocal rotation in substantially simultaneous manner; and, a check plate coupled to said mounting frame and extending between said cutter shafts of said blade assemblies, the said check plate having a plurality of corresponding holes respectively receiving said cutter shafts, and a plurality of limit grooves each spaced radially from and extending arcuately about a respective one of said corresponding holes, each said limit groove slidably receiving said anchoring screw of one said blade assembly for maintaining the reciprocal rotation thereof within the settable angle limit.

2. The cutting fixture as recited in claim 1, wherein each said limit groove of said check plate defines an angular limit greater than the settable angle limit for the reciprocal rotation of said blade assemblies.

3. The cutting fixture as recited in claim 1, wherein said power structure includes a servo-motor reversibly operable to drive clockwise and counter-clockwise rotations within the settable angle limit.

4. The cutting fixture as recited in claim 1, wherein said power structure includes a motor reversibly operable to drive clockwise and counter-clockwise rotations.

* * * * *